United States Patent
Miller et al.

(10) Patent No.: US 7,292,186 B2
(45) Date of Patent: Nov. 6, 2007

(54) METHOD AND SYSTEM FOR SYNCHRONIZING MULTIPLE TRACKING DEVICES FOR A GEO-LOCATION SYSTEM

(75) Inventors: Steven R. Miller, Scottsdale, AZ (US); Bradley P. Badke, Chandler, AZ (US); Michael L. Whitehead, Scottsdale, AZ (US)

(73) Assignee: CSI Wireless Inc., Calgary (CA)

( * ) Notice: Subject to any disclaimer, the term of this patent is extended or adjusted under 35 U.S.C. 154(b) by 303 days.

(21) Appl. No.: 11/029,809

(22) Filed: Jan. 5, 2005

(65) Prior Publication Data

US 2005/0116859 A1 Jun. 2, 2005

Related U.S. Application Data

(63) Continuation-in-part of application No. 10/828,745, filed on Apr. 21, 2004.

(60) Provisional application No. 60/464,756, filed on Apr. 23, 2003.

(51) Int. Cl.
 G01S 5/14 (2006.01)
 H04L 7/00 (2006.01)
(52) U.S. Cl. .................. 342/357.15; 375/355
(58) Field of Classification Search ........... 342/357.08, 342/357.15
See application file for complete search history.

(56) References Cited

U.S. PATENT DOCUMENTS

| | | | |
|---|---|---|---|
| 5,202,829 A | 4/1993 | Geier | |
| 5,521,887 A * | 5/1996 | Loomis | 368/47 |
| 5,969,670 A | 10/1999 | Kalafus et al. | 342/357.02 |
| 5,990,827 A * | 11/1999 | Fan et al. | 342/357.11 |
| 6,057,800 A | 5/2000 | Yang et al. | 342/357.08 |
| 6,122,595 A | 9/2000 | Varley et al. | 701/220 |
| 6,191,733 B1 | 2/2001 | Dizchavez | 342/357.17 |
| 6,229,479 B1 | 5/2001 | Kozlov et al. | 342/357.06 |
| 6,253,160 B1 | 6/2001 | Hanseder | |
| 6,285,320 B1 | 9/2001 | Olster et al. | 342/464 |
| 6,469,663 B1 | 10/2002 | Whitehead et al. | 342/357.03 |
| 6,515,619 B1 | 2/2003 | McKay et al. | 342/357.07 |
| 6,542,077 B2 | 4/2003 | Joao | 340/539 |
| 6,646,603 B2 * | 11/2003 | Dooley et al. | 342/458 |
| 6,657,585 B1 | 12/2003 | Kucik | |
| 6,922,635 B2 | 7/2005 | Rorabaugh | |
| 6,983,160 B2 * | 1/2006 | Drawert | 455/502 |
| 7,084,809 B2 * | 8/2006 | Hockley et al. | 342/357.08 |

* cited by examiner

*Primary Examiner*—Gregory C Issing
(74) *Attorney, Agent, or Firm*—Mark E. Brown

(57) ABSTRACT

A method and system of synchronizing multiple tracking devices in a geo-location receiver system comprising: receiving a first plurality of geo-location signals with a first tracking device; and receiving a second plurality of geo-location signals with a second tracking device. The method also includes: enabling the first tracking device as either a master tracking device or a master-with-mark tracking device; enabling the second tracking device to operate as a slave tracking device; the master tracking device generates and transmits a timing signal to the slave tracking device; and the master-with-mark tracking device is configured to receive an external input for synchronization and generates and transmits a timing signal to the slave tracking device. The method also includes acquiring the first plurality of geo-location signals and the second plurality of geo-location signals at a substantially simultaneous instant of time.

24 Claims, 5 Drawing Sheets

METHOD AND SYSTEM FOR SYNCHRONIZING MULTIPLE TRACKING DEVICES FOR A GEO-LOCATION SYSTEM

CROSS REFERENCE TO RELATED APPLICATIONS

This is a continuation-in-part application of commonly assigned U.S. application Ser. No. 10/828,745, entitled Method and System for Satellite Based Phase Measurements for Relative Positioning of Fixed or Slow Moving Points in Close Proximity filed Apr. 21, 2004, which claims the benefit of U.S. Provisional Application No. 60/464,756, filed Apr. 23, 2003 the contents, each of which, are incorporated by reference herein in their entirety.

BACKGROUND

This invention relates generally to Global navigation satellite system (GNSS) direct sequence spread spectrum receivers. Examples of GNSS receivers include Global Positioning System (GPS) receivers, Galileo receivers (the European equivalent of GPS), GLONASS receivers (the Russian equivalent of GPS), and Space Based Augmentation System (SBAS) receivers. As an example, the GPS (which predates Galileo, GLONASS, and SBAS) operates by broadcasting direct sequence spread spectrum timing signals on L1 (1575.42 MHz) and L2 (1227.6 MHz) carrier frequencies from a constellation of greater than 24 satellites in a half geo-synchronous orbit. These signals, when properly processed by a GNSS receiver, permit determination of position and velocity.

With existing receivers, the measurements of satellite information are usually taken at periodic time epochs, each epoch denoted as a TIC. TIC is an internally generated signal produced by each multi-channel correlator within the receiver. The correlator is the portion of the receiver that performs the high-speed digital processing necessary to track geo-location satellites. However, as each receiver operates independently, each receiver acquires its data asynchronously. Asynchronous acquisition of data leads to timing discrepancies between correlators. Therefore, it is desired to have a method and an apparatus for synchronizing the precise timing of measurements across multiple correlators and receivers. Furthermore, it is desired that a receiver and correlator be user configurable as desired to facilitate the synchronization.

BRIEF SUMMARY

Disclosed herein in an exemplary embodiment is a method of synchronizing multiple tracking devices in a geo-location receiver system comprising: receiving a first plurality of geo-location signals with a first tracking device; and receiving a second plurality of geo-location signals with a second tracking device. The method also includes: enabling the first tracking device as either a master tracking device or a master-with-mark tracking device; enabling the second tracking device to operate as a slave tracking device; the master tracking device generates and transmits a timing signal to the slave tracking device; and the master-with-mark tracking device is configured to receive an external input for synchronization and generates and transmits a timing signal to the slave tracking device. The method also includes acquiring the first plurality of geo-location signals and the second plurality of geo-location signals at a substantially simultaneous instant of time.

Also disclosed herein in an exemplary embodiment is a geo-location receiver system with synchronized multiple tracking devices comprising: a first tracking device configured to receive a first plurality of geo-location signals; and a second tracking device configured to receive a second plurality of geo-location signals. The first tracking device is configured to operate as at least one of a master tracking device or a master-with-mark tracking device and the second tracking device is configured to operate as a slave tracking device and the master tracking device generates and transmits a timing signal to the slave tracking device. The master-with-mark tracking device is configured to receive an external input for synchronization and transmits a timing signal to the slave tracking device. The first tracking device and second tracking device acquire the first plurality of geo-location signals and the second plurality of geo-location signals respectively at a substantially simultaneous instant of time.

Further, disclosed herein in yet another exemplary embodiment is an apparatus for synchronizing multiple tracking devices in a geo-location receiver system comprising: means for receiving a first plurality of geo-location signals with a first tracking device; and means for receiving a second plurality of geo-location signals with a second tracking device. The apparatus also includes: means for enabling the first tracking device as either a master tracking device or a master-with-mark tracking device; means for enabling the second tracking device to operate as a slave tracking device; wherein the master tracking device generates and transmits a timing signal to the slave tracking device; and the master-with-mark tracking device is configured to receive an external input for synchronization and generates and transmits a timing signal to the slave tracking device. The system also includes means for acquiring the first plurality of geo-location signals and the second plurality of geo-location signals at a substantially simultaneous instant of time.

Also disclosed herein in an exemplary embodiment is a storage medium encoded with a machine-readable computer program code for synchronizing multiple tracking devices in a geo-location receiver system including instructions for causing a computer to implement the abovementioned method.

Further disclosed herein in another exemplary embodiment is a computer data signal embodied in a computer readable format for synchronizing multiple tracking devices in a geo-location receiver system, the computer data signal including instructions for causing a computer to implement the abovementioned method.

BRIEF DESCRIPTION OF THE DRAWINGS

These and other features, aspects and advantages of the present invention will become better understood with regard to the following description, appended claims and accompanying drawing wherein like elements are numbered alike in the several Figures:

DETAILED DESCRIPTION

This invention relates generally to Global Navigation Satellite System (GNSS) direct sequence spread spectrum receivers. Disclosed herein in an exemplary embodiment is a method and an apparatus for synchronizing the precise time of measurements occurring on a receiver of a geo-location system including, but not limited to the Global Positioning System (GPS). Furthermore, it will be appreciated that the embodiments disclosed herein permit a user to configure a plurality of receivers as desired to facilitate the synchronization.

It will be appreciated that the satellite systems as discussed herein may include, but not be limited to Space Based Augmentation System (SBAS), Global Navigation Satellite System (GNSS) including GPS, Global Orbiting Navigation Satellite System, (GLONASS), Galileo (European equivalent of GPS) and other satellite ranging technologies. The term SBAS here is used as a generic reference to all GNSS augmentation systems which, to date, include three programs: WAAS (Wide Area Augmentation System) in the USA, EGNOS (European Geostationary Navigation Overlay System) in Europe and MSAS (Multifunctional Transport Satellite Space-based Augmentation System) in Japan. Each of these three systems, which are all compatible, consists of a ground network for observing the GPS constellation, and one or more geostationary satellites. It will be further appreciated that while the exemplary embodiments are described herein with respect to GPS and GPS satellite signals, these references are only illustrative. The invention is equally applicable to any geo-location system and geo-location satellite signals.

Figure 1:
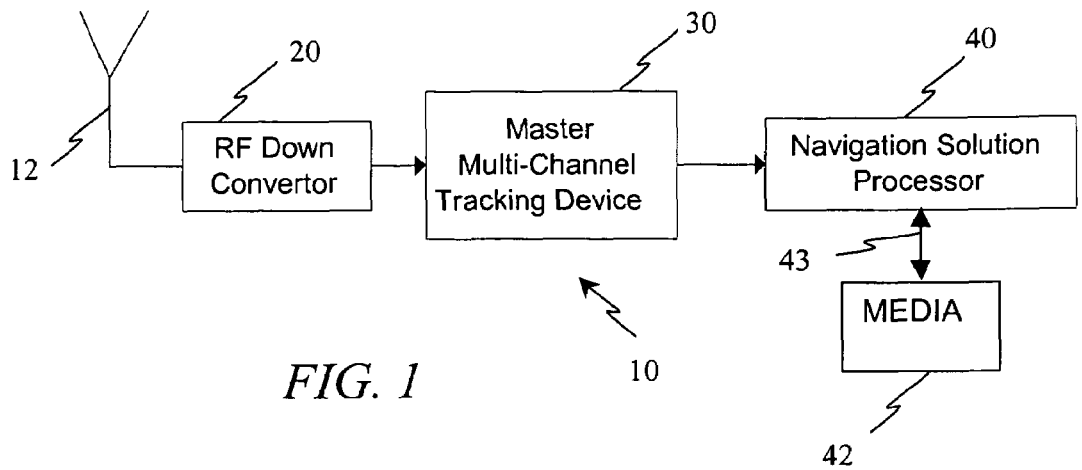
FIG. 1 depicts a simplified block diagram of a GPS receiver.

FIG. 1 depicts a simplified block diagram of a GNSS receiver shown generally as reference numeral 10. As seen in the figure, an RF down converter 20 receives signals from an antenna 12. The GNSS receiver 10 also includes, but is not limited to, multiple carrier phase trackers, multiple code signal trackers both hereinafter denoted as Digital Signal Processor (DSP) tracking device 30 for brevity. The tracking device 30 is attached to the RF front end/down converter 20 from which data samples are taken, and to a navigation computer 40 that performs the location solution.

Figure 2:
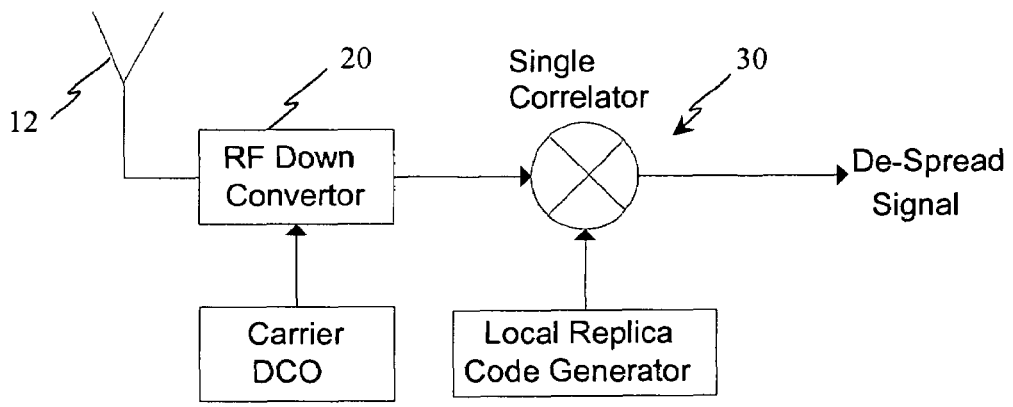
FIG. 2 depicts a simplified block diagram showing carrier phase tracking.

The purpose of a GNSS down converter is to down convert the incoming GNSS signal to a lower carrier frequency that is more convenient for processing of the GNSS signal. A carrier phase tracker may be implemented with the RF down converter 20, a carrier DCO (Digitally Controlled Oscillator) and some closed loop method of aligning the phase of the carrier DCO with the carrier phase of the incoming signal. This operation of the carrier phase tracker is depicted in FIGS. 2 and 3.

Furthermore, the purpose of a GNSS correlator is to multiply the incoming GNSS spreading code by a local replica of the GNSS spreading code. This process is called de-spreading the signal. Since the spreading code is a pseudo-random sequence, if the local replica code generator is time aligned with the incoming spreading code the spreading code is said to be 'wiped off' or 'de-spread'. After the incoming signal has been de-spread, the underlying GNSS data signal can be processed. This underlying data signal contains, among other things, information about the clocks and ephemeris of the GNSS satellites. FIGS. 2 and 3 also depict this de-spreading operation.

Figure 3:
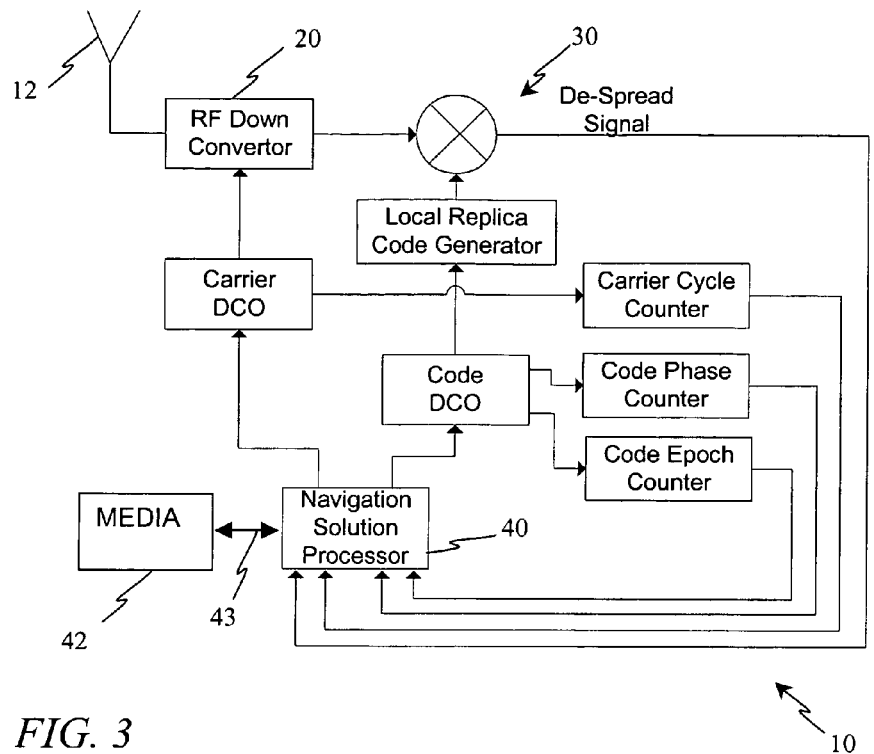
FIG. 3 depicts a simplified block diagram showing a code de-spreading function.

Continuing with FIG. 3, the navigation solution processor 40 closes the loop with the RF down converter 20 and carrier DCO for carrier phase recovery. The navigation processor 40 also closes the loop with the code DCO and the local replica code generator. The process of closing these two loops such that code alignment is maintained and carrier recovery is maintained generates measurements in the carrier cycle counter, carrier phase counter, code phase counter, and code epoch counter. These measurements, plus the same measurements corresponding to at least three other GNSS satellites along with the data in the GNSS signal facilitate the navigation solution processor solving for the GNSS receiver's location.

It is desirable that the carrier cycle counter, carrier phase counter, code phase counter, and code epoch counter measurements from all GNSS satellites used in the position solution be latched simultaneously. Therefore, in numerous exemplary embodiments, a method and an apparatus is disclosed for synchronizing the precise time of measurements occurring on a receiver of a geo-location system. More particularly, a method and system are disclosed for ensuring that carrier cycle counter, carrier phase counter, code phase counter, and code epoch counter measurements from selected GNSS satellites used in the navigation solution are taken at the same time within a tracking device 30. One method for synchronization between multiple receivers is disclosed in commonly assigned U.S. patent application Ser. No. 10/828,745, filed Apr. 21, 2004 entitled Method And System For Satellite Based Phase Measurements For Relative Positioning Of Fixed Or Slow Moving Points In Close Proximity. In this patent, there is disclosed a method and apparatus for measuring relative position of fixed or slow-moving points in close proximity comprising: receiving a first set of satellite signals with a first receiver corresponding to a first position; receiving another set of satellite signals with a second receiver corresponding to a second position; and acquiring the first set of satellite signals and said another set of satellite signals at substantially the same instant of time. The clock used in the first receiver and the clock used in the second receiver are synchronized to eliminate clock variation between the first receiver and the second receiver or the first receiver and the second receiver share a common clock. This technique facilitates elimination of the receiver clock errors but does not address the synchronization within the tracking devices 30. Furthermore, the exemplary embodiments disclosed herein provide for a configurable tracking device 30

Figure 4:
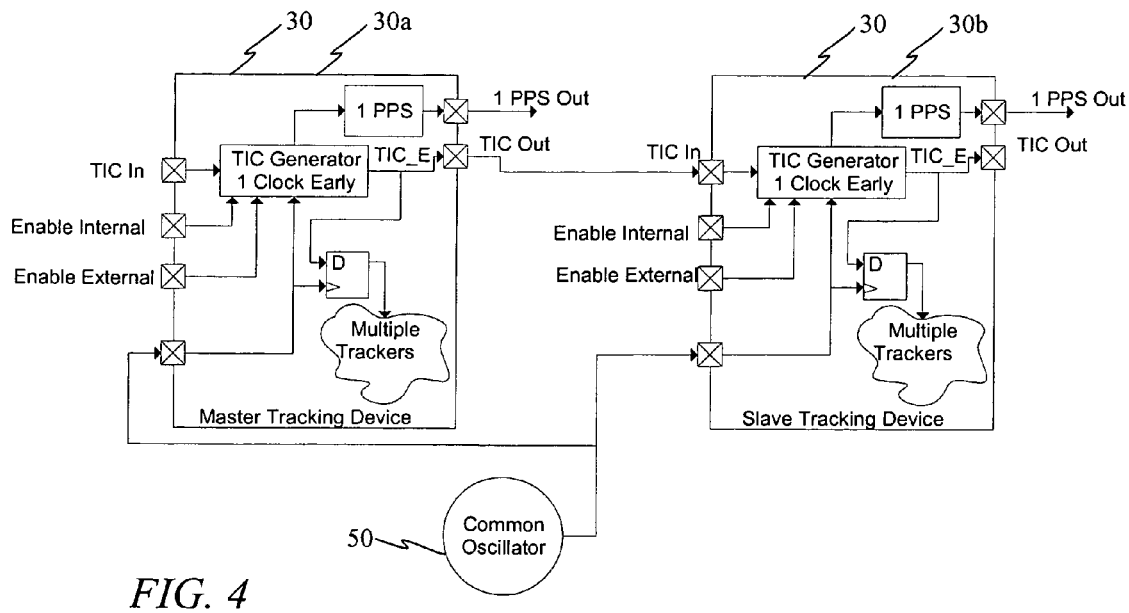
FIG. 4 depicts a Master/Slave TIC timing configuration for two tracking devices.

Turning now to FIG. 4 as well, in an exemplary embodiment a method and apparatus is disclosed herein to enforce this synchronization across the boundaries of multiple tracking devices 30. As stated earlier, measurements of satellite signals are usually taken at periodic time epochs, each epoch denoted as a TIC. TIC is an internally generated signal produced by each multi-channel tracking device 30 within the receiver 10. This yields the capability of being able to expand a GNSS receiver to track as many GNSS signals as desired by connecting together multiple tracking devices 30, each of a fixed number of channels. Furthermore, in the case of an attitude or heading system, two or more antennas are desirable with a dedicated tracking device for each antenna. Synchronization between tracking devices 30 on such an attitude or heading system results in a constant clock error between relative tracking device/Antenna pairs and ultimately strengthens the attitude solution by avoiding repeated clock solutions. Other multiple antenna systems having possibly obstructed views of the sky and consequently a reduced number of GNSS tracked satellites may also benefit from such synchronization. Still a further need for synchronization is when multiple GNSS constellations are in place (i.e., GPS and Galileo) and a different tracking device type is needed for each GNSS system but it is still desirable that the tracking device produce observations aligned to a common TIC.

The purpose of the TIC is to latch measurement data of all the channels in the tracking device 30 at the same instant in time. It is also possible for a tracking device 30 to use an externally generated TIC. When a device uses an externally generated TIC, that tracking device 30 or receiver 10 is referred to as a slave tracking device 30, while the tracking device 30 generating an externally generated TIC is referred to as a master tracking device 30. The period between TIC's is programmable and is often adjusted such that once each second a TIC will align with Universal Coordinate Time (UTC) producing a one pulse per second (1 PPS) output.

In an exemplary embodiment, a GNSS receiver 10 has twelve code signal correlators and twelve carrier phase trackers within its tracking device 30. It will be appreciated that the quantity twelve is historically significant in that traditionally there have been no more than twelve GNSS satellites in view of a GNSS receiver. With the advent of SBAS, Galileo, and GLONASS in addition to the GPS constellation; it is likely that more than twelve satellites emitting GNSS signals could be in view of a GNSS receiver. It will be appreciated that the method described herein does not require twelve correlators and carrier phase trackers. The quantity twelve is used as an illustrative example other quantities are readily conceivable and practiced.

Further, a GNSS receiver may require more code signal correlators and carrier phase trackers than there are satellites in view for some more complicated tasks other than just determining position and velocity such as the attitude determining system mentioned above. Another application might be attempting to mitigate multipath induced errors, multiple channels may be assigned to a single satellite with each channel tracking the satellite at a different code phase offset. Different offsets facilitate extraction of information that can be used to estimate the effect of the multipath on the correlation curve and possibly reduce tracking bias that often results from multipath. One method to achieve tracking devices 30 meeting the above needs of more than twelve channels would be to build a receiver with the exact desired number of code signal correlators and carrier phase trackers. However, such an approach may be needlessly expensive as it would not take advantage of repetition and requires larger, more expensive parts. Conversely, producing a single large, multi-channel device may also not be desirable, as a significant portion of the device may be wasted with products only requiring twelve channels. Furthermore, a single part solution is less flexible and does not readily facilitate easy reconfiguration or multiple applications of the same product, such as when moving from a two antenna heading system to a full attitude system employing three antennas.

An exemplary embodiment, addresses the abovementioned concerns and limitations by configuring a tracking device with the number of code signal correlators and carrier phase trackers needed for the simplest type of GNSS receiver desired. More complicated GNSS receivers 10 can then be built using multiple tracking device building blocks as needed as long as the tracking device building blocks are properly synchronized with one another. Therefore, a tracking device could be configurable to act either as a master—generating a TIC internally, or as a slave—reacting to an externally generated TIC, or as both (a master-with-mark), with perhaps the externally generated TIC being an event marker in an application that utilizes precisely timed GPS information corresponding to some external event.

Turning now to FIG. 4, where a master/slave TIC timing configuration in accordance with an exemplary embodiment is depicted. In the figure, a first tracking device 30 and a second tracking device 30 are depicted with each tracking device being clocked with a common oscillator 50. An Enable Internal signal is also employed to cause the first tracking device 30 to be configured as a master, also denoted 30a, while an Enable External signal is employed to cause another tracking device 30 to be configured as a slave, also denoted as 30b. When an Enable Internal input is active, a tracking device 30 uses its own internally generated TIC. When an Enable External is active, a tracking device 30 uses the external TIC on the TIC input line of the respective tracking device 30. When both Enable External and Enable Internal are established as active, this is called master-with-mark mode. When in master-with-mark mode, the receiver operates as a Master and generates an internal TIC, however, like a slave, a positive logic (high) input TIC In signal can force an immediate latching of the measurement data of all the channels in the tracking device 30 at that instant in time.

In order to pass the TIC signal from a Master tracking device 30a to a Slave tracking device 30b in an exemplary embodiment, care is taken to ensure maintaining the correct timing. First, to ensure that the same TIC is used within each tracking device 30, the TIC generator within the Master tracking device 30a generates the TIC a selected number of clock cycles early, in an embodiment, one clock cycle early. The TIC is then delayed a selected number of clock cycles and synchronized across all the tracking devices 30, 30b. In an exemplary embodiment, a single clock cycle delay is employed and a D flip flop in each tracking device is employed for the synchronization. Two or more clock cycle delays are also possible.

Second, the propagation times from the common oscillator 50 to each tracking device 30 should be maintained as substantially equal. In an exemplary embodiment this is accomplished by ensuring that the path length from the common oscillator 50 to each tracking device 30 are maintained as substantially equal. However, it will be appreciated that other well known methods for maintaining substantially equal propagation times among the tracking devices are possible, including, but not limited to, delay devices, impedance adjustments and the like.

Furthermore, it should be noted that the two signals Enable Internal and Enable External may be configured as hardware controlled or software controlled or under both hardware and software control. Either methodology does not affect the breadth of the invention for implementing the master/slave control.

Figure 5:
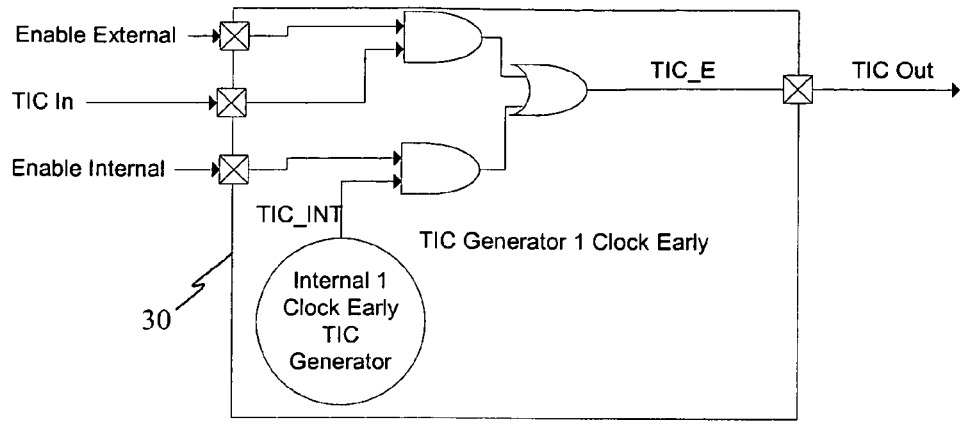
FIG. 5 depicts generation of an early TIC Clock in accordance with an exemplary embodiment.

Turning now to FIG. 5 for a better appreciation of how the "TIC Generator 1 Clock Early" function for a tracking device 30, configured as a master tracking device 30a, may be implemented in accordance with an exemplary embodiment. It will be appreciated that the Enable External, and Enable Internal are control signals. It may be instructive to view Table 1 for further explanation regarding the operation mode of a tracking device 30 as a function of the states of these two signals.

TABLE 1

TIC Generator 1 Clock Early Truth Table

| Enable External | Enable Internal | TIC_E | Operating Mode |
|---|---|---|---|
| 0 | 0 | 0 | Not Used |
| 0 | 1 | TIC_NT | Master |
| 1 | 0 | TIC In | Slave |
| 1 | 1 | TIC In OR TIC_INT | Master-With-Mark |

Referring to the table, the signal denoted TIC_E signals the correlation device 30 to sample data. In an exemplary embodiment, the TIC_E signal is a function of the external TIC_IN and an internally generated TIC_INT based on an internal clock. When in Master mode, the internally generated TIC_INT is used by the tracking device 30 to produce TIC_E. When in Slave mode, the TIC used by the Slave tracking device will be TIC_IN.

When in master-with-mark mode, an active state transition for either TIC_IN or TIC_INT will cause the tracking device to declare an epoch TIC_E and to capture the measurement data. In an exemplary embodiment, TIC_IN is usually asynchronous and corresponds to an externally triggered mark (event mark), while TIC_INT is typically driven at a prescribed periodic interval.

Figure 6:
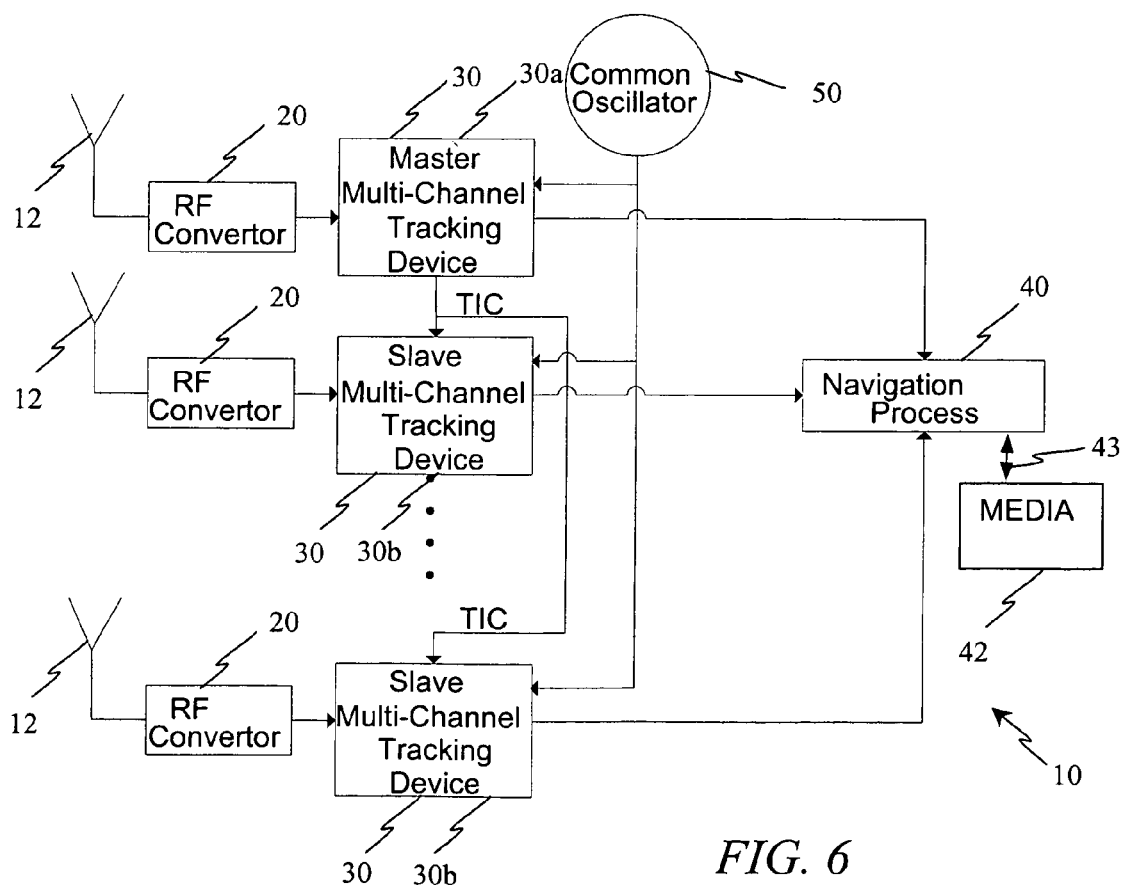
FIG. 6 depicts an expansion of the system depicted in FIG. 5 applied to multiple slave tracking devices and optionally tracking devices for various satellites in accordance with another exemplary embodiment.

FIG. 6 depicts an expansion of the system depicted in FIG. 5 now applied to multiple slave tracking devices 30b. In an exemplary embodiment, a single master tracking device 30a is employed with several slave tracking devices 30b. Ideally, there is no limitation on the number of slave tracking devices that may be employed provided the physical layout considerations identified earlier are addressed.

In an exemplary embodiment, a receiver 10 may contain multiple channel tracking devices 30, that in turn include multiple, e.g., twelve, spread spectrum de-correlator and multiple, e.g., twelve carrier recovery circuits. Such a configuration permits any multiple channel tracking device 30 to track numerous GPS satellites, for instance, twelve with the example given. These tracking devices 30 may also be capable of tracking various other satellite signals, including, but not limited to Satellite based Augmentation (SBAS) signals such as those from the Wide Area Augmentation System (WAAS) satellites. The tracking device 30 may also be used for other Global Navigation Systems (GNS) system satellites such as Galileo and Global Orbiting Navigation Satellite System (GLONASS) satellites. It will be appreciated that SBAS satellites are intended to augment GPS by improving the accuracy, availability and integrity of GPS navigation. SBAS satellites act as additional ranging sources while broadcasting information that can be used to correct errors in the measured distances to the GPS satellites. Galileo satellites are the European equivalent of GPS, while GLONASS is the Russian counterpart to the U.S. GPS system.

Figure 7:
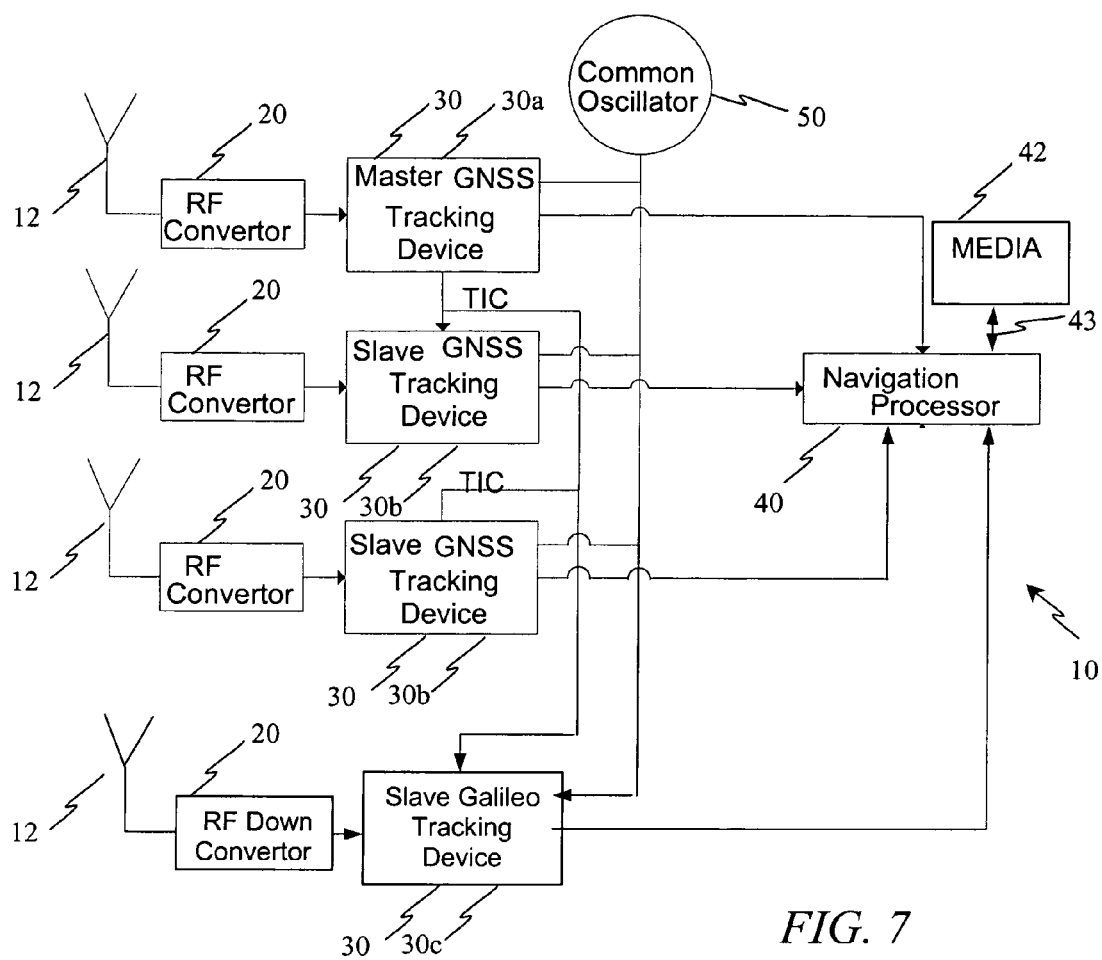
FIG. 7 depicts another system of an exemplary embodiment to facilitate tracking several satellites with multiple antennas or a particular type of satellite.

Continuing with FIG. 6, and turning now to FIG. 7, in some situations it may be desirable to track several satellites with multiple antennas 12. One reason to employ tracking of numerous satellites with multiple antennas 12 is to determine direction vectors between the receivers/antennas 10/12, which then permits calculation of the receiver's/antenna's 10/12 attitude. For example, yaw, pitch, and roll may be calculated. In an exemplary embodiment, to form the direction vectors based on multiple antennas 12 tracking several satellites, (preferably the same satellites), it is advantageous to synchronize the correlation devices 30 of each receiver 10 so that they take measurements at the same instant of time. Advantageously, this approach results in the cancellation of rapid fluctuations in the carrier phase measurements when differenced between synchronized tracking devices 30 that may not cancel otherwise due to their rapidly varying nature. It also assures that the time offset between master tracking device 30a and a slave tracking device 30b remains nearly constant, which reduces the number of satellites that must be tracked and strengthens the attitude solution by eliminating one unknown in the solution. Furthermore, often, the distances of these antennas 12 relative to one another is known in an attitude determination system, and this helps in determining the direction vectors by eliminating yet another unknown.

By using three antennas 12 and three multiple channel tracking devices 30 it is possible to determine the complete 3-axis orientation for the receiver 10 (solve for all 3 degrees of freedom). Two multiple channel tracking devices 30 will yield a two-axis solution.

In some situations it may be desirable to use both GPS satellites and Galileo satellites to obtain a navigation solution. Furthermore, it may be advantageous to have one tracking device 30a, 30b for GPS, and another tracking device 30 for Galileo satellites, in this instance denoted as 30c, perhaps to save cost, or simplify design efforts. When this is the case, to synchronize the GPS tracking devices 30a, and 30b, as well as the Galileo tracking devices 30c, the TIC signal is also applied to the Galileo tracking device 30c. FIG. 7 also depicts an implementation of an exemplary embodiment with a tracking device 30c for Galileo satellites synchronized with other GPS tracking devices 30a, and 30b.

Figure 8:
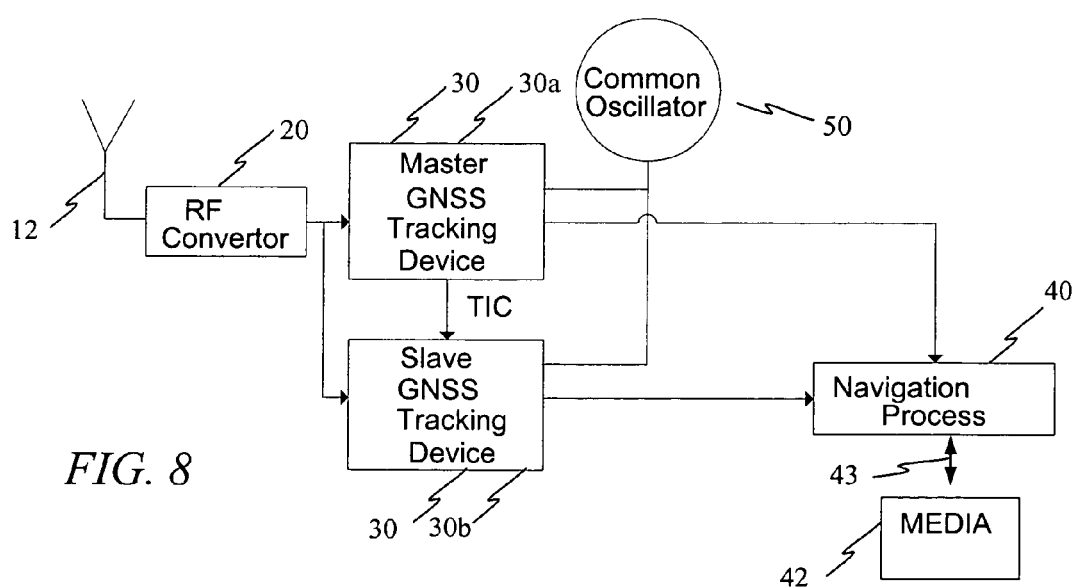
FIG. 8 depicts a receiver system of an exemplary embodiment configured to facilitate assigning multiple tracking channels to a single satellite.

In another exemplary embodiment a GPS receiver 10 is configured such that it tracks more than the number of channels that an individual tracking device 30 can track. FIG. 8 depicts a receiver system configured to facilitate assigning multiple tracking channels to a single satellite. Such a configuration facilitates, in one exemplary embodiment, enabling multi-path components of the received signal to be determined by taking correlation measurements at different phase offsets of the tracked satellite ranging code. The measurements taken at different phases deviate from an ideal pattern due to the effects of multi-path.

Another feature of the configuration of FIG. 8 is that there may be three or more desired WAAS (or other SBAS) satellites to track. For the case where the GPS tracking device 30 has finite number (e.g., twelve or fewer) channels this may reduce the number of channels available for tracking GPS satellites to an undesirable or unacceptable level, and thereby, resulting in undesirable or lost GPS solution. With the configuration of the system depicted in FIG. 8, the number of available tracking devices 30 can be increased to ensure an acceptable level for tracking GPS satellites and facilitate augmentation with additional non-GPS satellites.

Yet another feature and advantage of such a configuration depicted in FIG. 8 is to increase initial acquisition speed.

This is accomplished by trying to synchronize with a single GPS satellite using multiple tracking devices 30. Taking advantage of the simplified solution set afforded by the synchronized tracking devices 30. This approach is highly advantageous in applications where acquisition is impacted by reduced availability or view of satellites. Furthermore, the configuration of the receiver system 10 of FIG. 6 may permit significant cost savings, in that it may be less expensive to use multiple tracking devices 30 than it is to add additional channels to a single tracking device 30.

Figure 9:
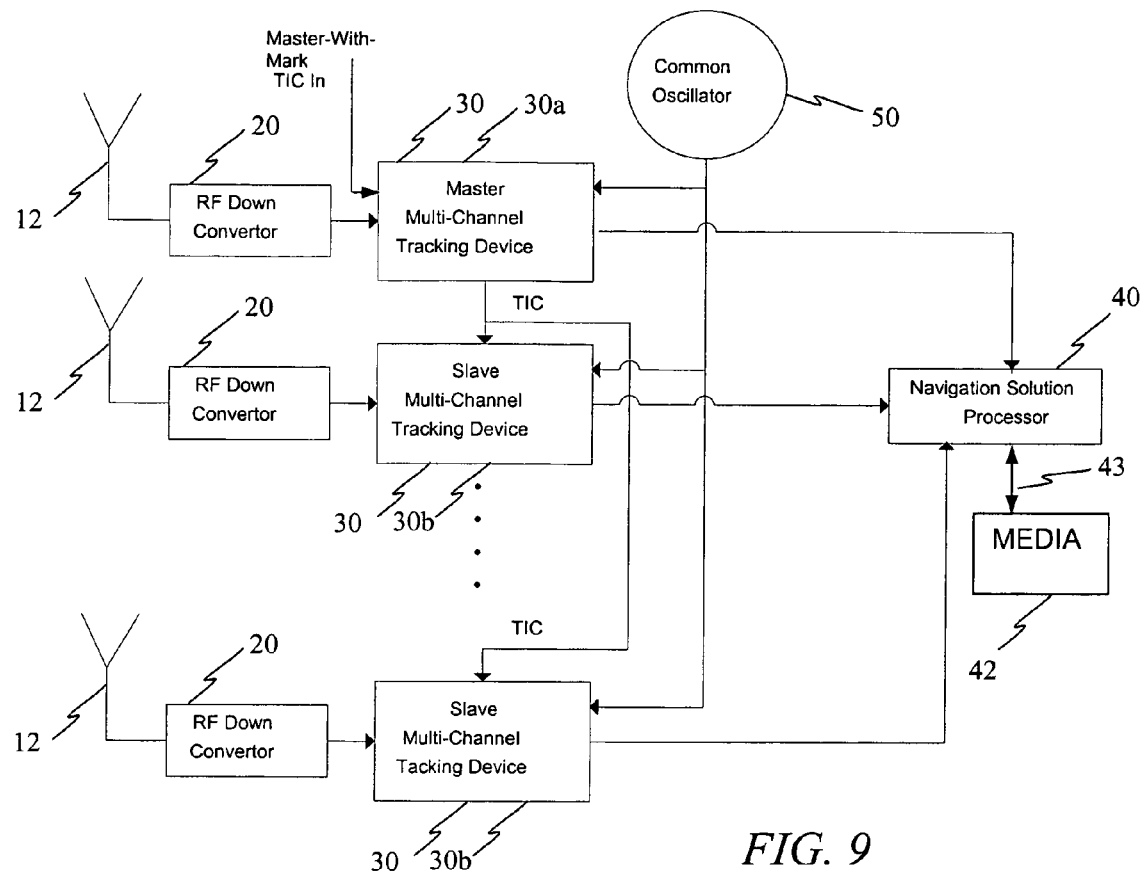
FIG. 9 depicts a configuration of a receiver system responsive to an external event in accordance with yet another exemplary embodiment.

Turning now to FIG. 9 for a depiction of another exemplary embodiment illustrating the master-with-mark mode of operation. FIG. 9 depicts a configuration of a receiver system 10 responsive to an external event. That is, there may be some event external to all of the tracking devices 30, which generates a TIC. In this instance, all of the tracking devices 30 operate as slaves to this external event. The master-with-mark mode of operation yields the capability of essentially converting the master tracking device 30a into a slave 30b subject to an external event. Advantageously, one benefit to the master-with-mark functionality and establishing a master tracking device 30a dependent on an external event might be any event where timing with an external function is desired. For example, aerial photography where it is desired that a GPS location be determined simultaneously with a camera shutter opening, the shutter may be synchronized to the GPS through the use of master-with-mark functionality.

Figure 10:
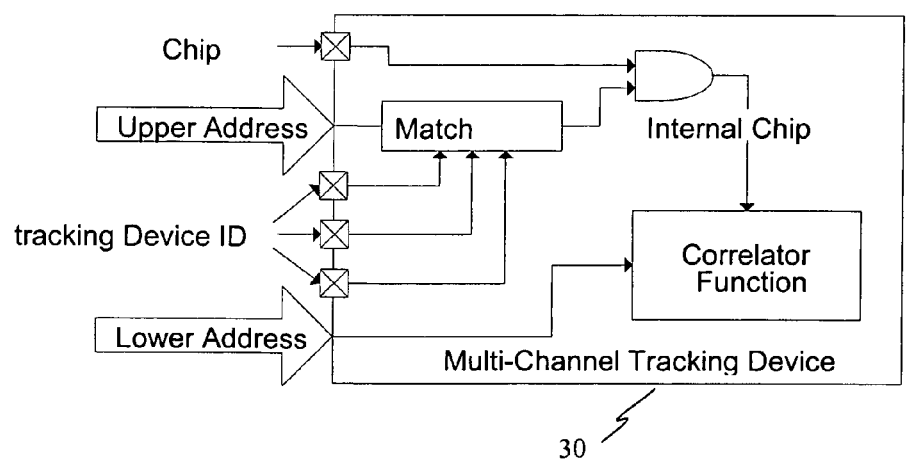
FIG. 10 depicts another configuration of the tracking device employing a selection functionality in accordance with another exemplary embodiment.

In many cases, the number of chip selects available from the Navigation Solution Processor 40 may limit the number of tracking devices 30 that can be accessed. Since most processors 40 have at least 16 bits of address lines it is possible to create a chip select decoder for the tracking devices 30 using a single chip select and some of the address lines from the processor 40. FIG. 10 depicts another configuration of the tracking device 30 employing selection functionality in accordance with another exemplary embodiment.

In FIG. 10, the upper and lower address bits and the chip select come directly from the Navigation Solution Processor 40. The ID pins of the tracking device 30 are configured so that each multi-channel tracking device 30 can be uniquely identified. For example, FIG. 10 depicts a correlator device 30 with three ID inputs. With this configuration it is possible to uniquely identify eight devices. This is only an example; the concept can be expanded to uniquely identify more or fewer devices. The only physical limitation is due to the number of address bits and other functions available for encoding.

It will be appreciated that while a particular series of steps or procedures is described as part of the abovementioned process, no order of steps should necessarily be inferred from the order of presentation. For example, the process includes receiving one or more sets of satellite signals. It should be evident the order of receiving the satellite signals is variable and could be reversed without impacting the methodology disclosed herein or the scope of the claims.

It should further be appreciated that while an exemplary partitioning functionality has been provided. It should be apparent to one skilled in the art, that the partitioning could be different. For example, the control of the master tracking device 30a and slave tracking device 30b, could be integrated in any, or another unit. The processes may, for ease of implementation, be integrated into a single unit. Such configuration variances should be considered equivalent and within the scope of the disclosure and claims herein.

It will be appreciated that the use of first and second or other similar nomenclature for denoting similar items is not intended to specify or imply any particular order unless otherwise stated. Furthermore, the use of the terminology "a" and "at least one of" shall each be associated with the meaning "one or more" unless specifically stated otherwise.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the description has been made with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A method of synchronizing multiple tracking devices in a geo-location receiver system comprising:
receiving a first plurality of geo-location signals with a first tracking device; receiving a second plurality of geo-location signals with a second tracking device; enabling said first tracking device alternatively as either a master tracking device or a master-with-mark tracking device;
enabling said second tracking device to operate as a slave tracking device; wherein said master or master-with-mark first tracking device generates and transmits a timing signal to said slave second tracking device;
wherein said first tracking device in said master-with-mark enablement is configured to receive an external input for synchronization and generates and transmits a timing signal to said slave second tracking device;
acquiring said first plurality of geo-location signals and said second plurality of geo-location signals at a substantially simultaneous instant of time;
receiving an enable internal input to each said tracking device and receiving an enable external input to each said tracking device; and
wherein a tracking device is configured to operate as: a master with a first unique combination of internal and external input conditions; a slave with a second unique combination of internal and external input conditions;

and a master-with-mark with a third unique combination of internal and external input conditions.

2. The method of claim 1 further including said timing signal comprising clocking input to said first tracking device and said second tracking device.

3. The method of claim 1 further including computing a position based on at least one of said first plurality of geo-location signals and said second plurality of geo-location signals.

4. The method of claim 3 wherein said computing is based on at least one of code phase and carrier phase differencing techniques.

5. The method of claim 4 wherein said first tracking device and said second tracking device share a common clock and said acquiring is based on synchronizing said first tracking device and said second tracking device to eliminate clocking variation between said first tracking device and said second tracking device.

6. The method of claim 1 wherein a tracking device is configured to operate as;
   a master if said enable internal input is active or high and said enable external input is not active or low,
   a slave if said enable internal input is not active or low and said enable external input is active or high, and
   a master-with-mark if said enable internal input is active or high and said enable external input is active or high.

7. The method of claim 1 wherein a master tracking device outputs a timing signal within a selected duration of when it acquires said first plurality of geo-location signals, and said timing signal is employed by said slave tracking devices to enable their acquisition of said second plurality of geo-location signals.

8. The method of claim 1 wherein said first plurality of geo-location signals is equivalent to said second plurality of geo-location signals.

9. The method of claim 1 wherein at least one of said first tracking device and said second tracking device is a Galileo tracking device.

10. The method of claim 1 further including configuring said first tracking device and said second tracking device addresses to reside in a single chip select domain of a device communicating with said first tracking device and said second tracking device to ensure collision free access to data from each tracking device while using a single chip select for the addresses of all correlator devices within said chip select domain.

11. The method of claim 1 wherein at least one of said receiving a first plurality of geo-location signals with a first tracking device and said receiving a second plurality of geo-location signals with a second tracking device are from a plurality of antennas.

12. The method of claim 1 further comprising:
   receiving another plurality of geo-location signal with another tracking device, enabling said another tracking device to operate as one of said master tracking device, said master-with-mark tracking device or said slave tracking device; and
   acquiring said first plurality of geo-location signals, said second plurality of geo-location signals, and said another plurality of geo-location signals at a substantially simultaneous instant of time.

13. A geo-location receiver system with synchronized multiple tracking devices comprising:
   a first tracking device configured to receive a first plurality of geo-location signals;
   a second tracking device configured to receive a second plurality of geo-location signals;
   wherein said first tracking device is configured and adapted for enablement to operate as at least one of a master tracking device or a master-with-mark tracking device and said second tracking device is configured to operate as a slave tracking device;
   wherein said master or master-with-mark first tracking device generates and transmits a timing signal to said slave second tracking device;
   wherein said first tracking device in said master-with-mark enablement is configured to receive an external input for synchronization and transmits a timing signal to said slave second tracking device; and
   wherein said first tracking device and said second tracking device acquire said first plurality of geo-location signals and said second plurality of geo-location signals respectively at a substantially simultaneous instant of time;
   each said tracking device being configured to receive an enable internal input and an enable external input; and
   wherein a tracking device is configured to operate as; a master with a first unique combination of internal and external input conditions; a slave with a second unique combination of internal and external input conditions; and a master-with-mark with a third unique combination of internal and external input conditions.

14. The system of claim 13 further including said timing signal comprising a clocking input and said first tracking device and said second tracking device each configured to receive a clocking input.

15. The method of claim 13 further including computing a position based on at least one of said first plurality of geo-location signals and said second plurality of geo-location signal.

16. The method of claim 15 wherein said computing is based on at least one of code phase and carrier phase differencing techniques.

17. The method of claim 16 wherein said first tracking device and said second tracing device share a common clock and said acquiring is based on synchronizing said first tracking device and said second tracking device to eliminate clocking variation between said first tracking device and said second tracking device.

18. The system of claim 13 wherein a tracking device is configured to operate as; a master if said enable internal input is active or high and said enable external input is not active or low,
   a slave if said enable internal input is not active or low and said enable external input is active or high, and
   a master-with-mark if said enable internal input is active or high and said enable external input is active or high.

19. The system of claim 13 wherein a master tracking device outputs a timing signal within a selected duration of when it acquires said first plurality of geo-location signals, and said timing signal is employed by said slave tracking devices to enable their acquisition of said second plurality of geo-location signals.

20. The system of claim 13 wherein said first plurality of geo-location signals is equivalent to said second plurality of geo-location signals.

21. The system of claim 13 wherein at least one of said first tracking device and said second tracking device is a Galileo tracking device.

22. The system of claim 13 further including said first tracking device and said second tracking device each configured to reside in a single chip select domain of a device communicating with said first tracking device and said second tracking device to ensure collision free access to data from each tracking device while using a single chip select for the addresses of all tracking devices within said chip select domain.

23. The system of claim 13 wherein at least one of said receiving a first plurality of geo-location signals with a first tracking device and said receiving a second plurality of geo-location signals with a second tracking device are from a plurality of antennas.

24. The system of claim 13 further comprising:
another tracking device configured to receive another plurality of gee-location signals;

wherein said another tracking device is configured to operate as one of said master tracking device, said master-with-mark tracking device, or said slave tracking device;

wherein said first tracking device, said second tracking device, and said another tracking device acquire said first plurality of geo-location signals, said second plurality of geo-location signals, and said another plurality of geo-location signals, respectively, at a substantially simultaneous instant of time.

* * * * *